(12) United States Patent
Yamamoto et al.

(10) Patent No.: US 7,643,159 B2
(45) Date of Patent: Jan. 5, 2010

(54) THREE-DIMENSIONAL SHAPE MEASURING SYSTEM, AND THREE-DIMENSIONAL SHAPE MEASURING METHOD

(75) Inventors: Shinji Yamamoto, Sakai (JP); Yoshihisa Abe, Sakai (JP)

(73) Assignee: Konica Minolta Sensing, Inc., Sakai-shi (JP)

( * ) Notice: Subject to any disclaimer, the term of this patent is extended or adjusted under 35 U.S.C. 154(b) by 179 days.

(21) Appl. No.: 11/879,686

(22) Filed: Jul. 18, 2007

(65) Prior Publication Data
US 2008/0024795 A1 Jan. 31, 2008

(30) Foreign Application Priority Data
Jul. 25, 2006 (JP) ............................. 2006-201470

(51) Int. Cl.
*G01B 11/24* (2006.01)
(52) U.S. Cl. ...................................... 356/602; 356/623
(58) Field of Classification Search ............ 356/2–4.01, 356/600–624; 250/559.22–559.23; 382/118, 382/154; 702/159
See application file for complete search history.

(56) References Cited
U.S. PATENT DOCUMENTS
6,424,422 B1 * 7/2002 Kamon et al. ................ 356/623

FOREIGN PATENT DOCUMENTS
JP        9-145319 A     6/1997
JP        2000-2520 A    1/2000
JP        2000-105111 A  4/2000

* cited by examiner

Primary Examiner—Tarifur Chowdhury
Assistant Examiner—Michael Lapage
(74) Attorney, Agent, or Firm—Sidley Austin LLP

(57) ABSTRACT

A three-dimensional shape measuring system includes: a light projecting/receiving apparatus which causes a light receiver to receive light reflected on a surface of a measurement object onto a light receiving surface thereof at a predetermined cycle multiple times, while changing a projecting direction of the light; and a measuring apparatus for measuring a three-dimensional shape of the measurement object, utilizing light receiving data. The measuring apparatus includes: a light receiving time setter for setting a light receiving time in each cycle with respect to each of light receiving areas constituting the light receiving surface; a data converter for converting an output value representing the light receiving data obtained in each cycle into an output value standardized with respect to the light receiving time in each cycle, if the light receiving times are different in the cycles; a projection timing acquirer for acquiring a projection timing at which the light receiving amount of each light receiving area is maximum; and a position acquirer for acquiring a position of a measurement point on the surface of the measurement object corresponding to each light receiving area.

4 Claims, 13 Drawing Sheets

$T1=T2=T5=\frac{1}{2}T3=\frac{1}{2}T4$ $T1=T2=T3'=T4'=T5$

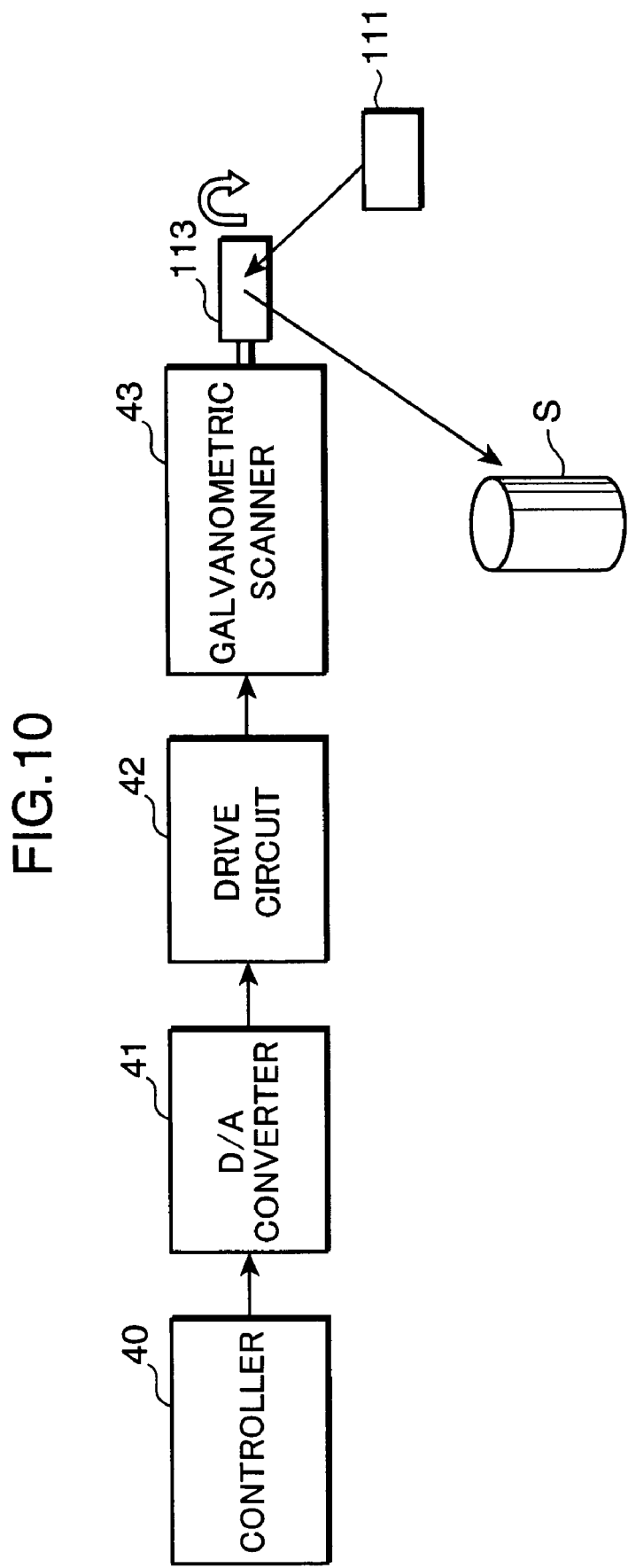

THREE-DIMENSIONAL SHAPE MEASURING SYSTEM, AND THREE-DIMENSIONAL SHAPE MEASURING METHOD

This application is based on Japanese Patent Application No. 2006-201470 filed on Jul. 25, 2006, the contents of which are hereby incorporated by reference.

BACKGROUND OF THE INVENTION

1. Field of the Invention

The present invention relates to a three-dimensional shape measuring system and a three-dimensional shape measuring method for measuring a three-dimensional shape of an object to be measured (hereinafter, called as "measurement object").

2. Description of the Related Art

Heretofore, there has been known a non-contact three-dimensional shape measuring apparatus for measuring a three-dimensional shape of the entirety of a measurement object by measuring a three-dimensional shape of a part of the measurement object in a non-contact state multiple times at a position around the measurement object, and by using the measurement results. The conventional non-contact three-dimensional shape measurement technique is disclosed in e.g. Japanese Unexamined Patent Publication Nos. Hei 9-145319 (D1), 2000-2520 (D2), and 2000-105111 (D3).

In the technologies disclosed in D1 through D3, slit light is projected toward a measurement object, and the light reflected on the measurement object is received by an area sensor. Then, the three-dimensional shape of the measurement object is derived by calculating a distance between a certain point on the surface of the measurement object, and a targeted pixel of the area sensor where the reflected light from the certain point on the surface of the measurement object is incident, based on the position of the targeted pixel on the area sensor.

D1 is designed to measure the shape of the measurement object with a higher resolution than the resolution defined by the pixel pitch. Specifically, in the case where the surface of the measurement object is scanned with slit light having a bandwidth corresponding to the widths of "n" pixels, the slit light is shifted by the pitch corresponding to one pixel at each sampling cycle. Effective light receiving data is obtained from one pixel by performing the sampling operation "n" times, and interpolation computation is performed by using the "n" light receiving data. Each of the pixels of the area sensor has a field of view, i.e. the center position of the field view in a strict sense, on the surface of the measurement object. The interpolation computation is performed to obtain a timing (a time centroid or a point of time when the light receiving amount of a targeted pixel is maximum) at which the optical axis of the slit light passes a certain measurement point, specifically, a center position for measurement. The position of a measurement point on the surface of the measurement object is calculated, based on a relation between the projecting direction of the slit light at the calculated timing, and the incident direction of the slit light onto the targeted pixel.

In D2, an operation of cyclically scanning a measurement object to capture an image of the measurement object is performed multiple times while changing the projecting direction of slit light. Also, the intensity of the slit light is changed in each of the scanning operations. Then, a scanning operation in which the obtained sampling data neither reaches a saturated level nor a black level is specified among the scanning operations. Then, a centroid in the specified scanning operation i.e. a centroid on a time axis of a distribution concerning multiple light receiving data obtained by multiple sampling operations executed by a one-time scanning operation is derived with respect to each of the pixels. Then, the shape of the measurement object is derived by using the centroids.

In D3, a non-destructive readable image sensor is used as an image sensor for capturing a reflected light component of slit light projected onto a measurement object. Specifically, multiple light receiving data obtained with different exposure times are acquired at respective sampling cycles from each of the pixels of the image sensor by a non-destructive reading method i.e. a method of retaining an electric charge in the image sensor, as far as a reset signal is not supplied. Unsaturated light receiving data is selected from the multiple light receiving data obtained with the different exposure times with respect to each of the pixels. Then, calculated is a timing at which the optical axis of the slit light passes the field of view on the surface of the measurement object corresponding to each of the pixels, using the light receiving data. Then, the position of the measurement point on the surface of the measurement object is calculated, based on a relation between the projecting direction of the slit light at the calculated timing, and the incident direction of the silt light onto the corresponding pixel.

The conventional three-dimensional shape measuring apparatuses need improvement in securing precision in measuring the three-dimensional shape of the measurement object. For instance, there is proposed an arrangement of calculating the position of the respective measurement points on the surface of a measurement object, using light receiving data obtained with a different exposure time i.e. a different light receiving period at each sampling cycle with respect to each of the pixels, in combination with the arrangement disclosed in D1.

The above arrangement requires a procedure of calculating a time centroid in correlation to a center timing in each of the light receiving periods, based on an assumption that the light receiving data is obtained in each of the sampling operations with the same light receiving period. In the above arrangement, the time centroid calculated with respect to each of the pixels may be displaced from the timing at which the optical axis actually passes each of the pixels. Accordingly, the three-dimensional shape of the measurement object measured by the aforementioned measuring technique may include a measurement error resulting from the displacement.

SUMMARY OF THE INVENTION

In view of the above problems residing in the conventional examples, it is an object of the present invention to provide a three-dimensional shape measuring system and a three-dimensional shape measuring method that enable to measure a three-dimensional shape of a measurement object with high precision.

A three-dimensional shape measuring system according to an aspect of the invention includes: a light projecting/receiving apparatus having: a light projector for projecting light toward a measurement object; and a light receiver having a light receiving surface, the light projecting/receiving apparatus causing the light receiver to receive the light reflected on a surface of the measurement object onto the light receiving surface thereof at a predetermined cycle multiple times, while causing the light projector to change a projecting direction of the light; and a measuring apparatus for acquiring a position, in a predetermined three-dimensional coordinate system, of each of measurement points on the surface of the measurement object by utilizing light receiving data representing a light receiving amount of the light receiver to be outputted from the light projecting/receiving apparatus to measure a three-dimensional shape of the measurement object based on the acquired positions in the three-dimensional coordinate system. The measuring apparatus includes: a light receiving time setter for setting a light receiving time in each of the cycles with respect to each of a plurality of light receiving areas constituting the light receiving surface; a data converter for converting an output value representing the light receiving data obtained in the each of the cycles into an output value which is standardized with respect to the light receiving time in the each of the cycles, if the light receiving times set by the light receiving time setter are different in the cycles in performing the light receiving operation on the each of the light receiving areas; a projection timing acquirer for acquiring a projection timing at which the light receiving amount of the each of the light receiving areas is maximum, by using a center timing in a light receiving period in the each of the cycles, and light receiving data to be obtained after the conversion by the data converter; and a position acquirer for acquiring a position of the measurement point on the surface of the measurement object corresponding to the each of the light receiving areas, based on a relation between the projecting direction of the light at each of the projection timings acquired by the projection timing acquirer, and an incident direction of the light which is reflected on the surface of the measurement object and is incident onto the each of the light receiving areas.

A three-dimensional shape measuring method according to another aspect of the invention includes: preparing a light projector for projecting light toward a measurement object, and a light receiver having a light receiving surface; setting, in performing a light projecting/receiving operation of receiving the light reflected on a surface of the measurement object onto the light receiving surface at a predetermined cycle multiple times, while changing a projecting direction of the light, a light receiving time in each of the cycles with respect to each of a plurality of light receiving areas constituting the light receiving surface; acquiring light receiving data in the each of the cycles by performing the light projecting/receiving operations; converting an output value representing the light receiving data obtained in the each of the cycles into an output value which is standardized with respect to the light receiving time in the each of the cycles, if the light receiving times set in the light receiving time setting operation are different in the cycles; acquiring a projection timing at which a light receiving amount of each of the light receiving areas is maximum, by using a center timing in a light receiving period in the each of the cycles, and light receiving data to be obtained after the conversion operation; acquiring a position, in a predetermined three-dimensional coordinate system, of each of measurement points on the surface of the measurement object, based on a relation between the projecting direction of the light at each of the projection timings acquired in the projection timing acquisition operation, and an incident direction of the light which is reflected on the surface of the measurement object and is incident onto the each of the light receiving areas; and deriving a three-dimensional shape of the measurement object based on the acquired positions in the three-dimensional coordinate system.

These and other objects, features and advantages of the present invention will become more apparent upon reading the following detailed description along with the accompanying drawing.

BRIEF DESCRIPTION OF THE DRAWINGS

FIG. 10 is a diagram showing an example of an arrangement of rotating a galvanometric mirror about a plane in a second modification of the embodiment.

DETAILED DESCRIPTION OF THE PREFERRED EMBODIMENTS

Figure 1:
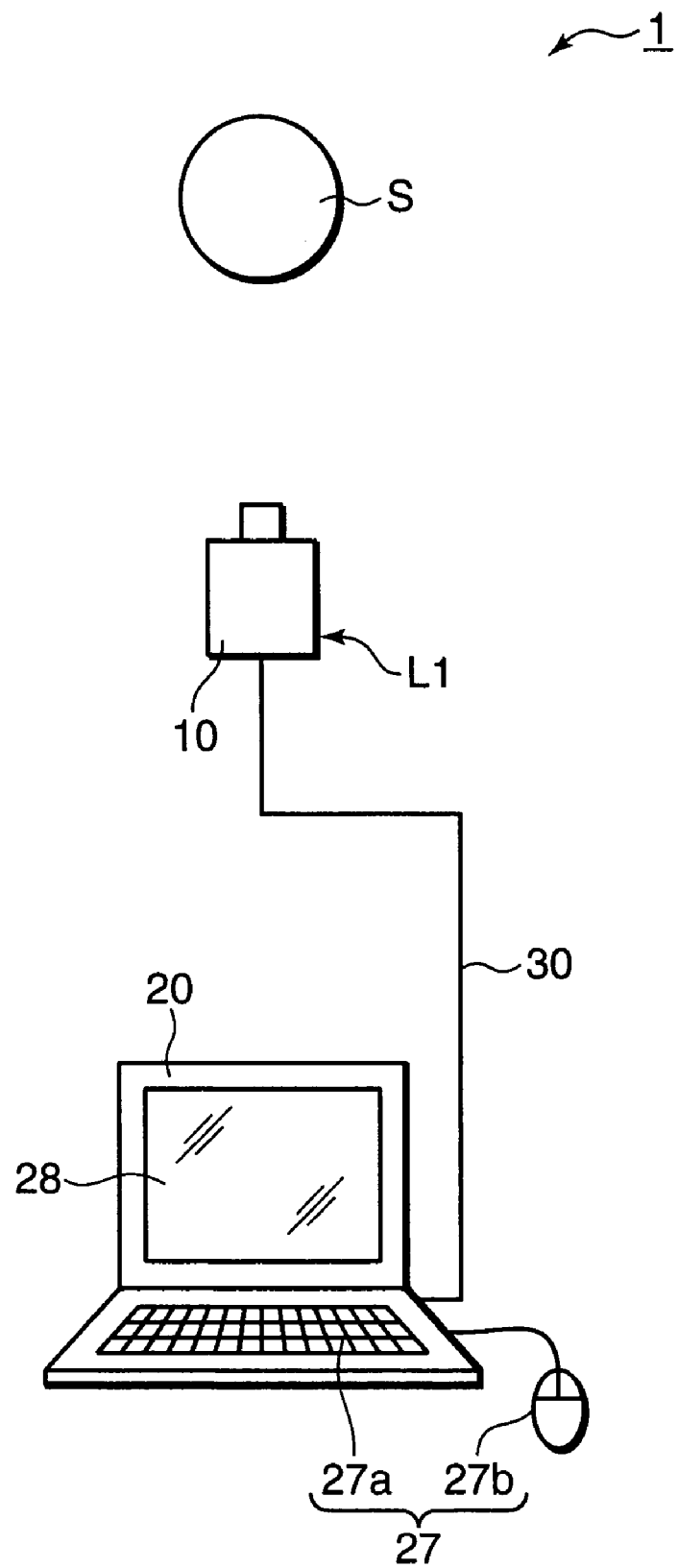
FIG. 1 is a diagram showing an entire arrangement of a three-dimensional shape measuring system embodying the invention.

In the following, a three-dimensional shape measuring system embodying the invention is described referring to the drawings. FIG. 1 is a diagram showing an entire arrangement of the three-dimensional shape measuring system 1 of the embodiment.

As shown in FIG. 1, the three-dimensional shape measuring system 1 includes a three-dimensional digitizer 10 and a personal computer 20 which are communicatively connected to each other. The three-dimensional digitizer 10 measures the shape of a measurement object S in a non-contact state, using light as a detecting medium, at a measurement position around the measurement object S. The three-dimensional shape of the entirety of the measurement object S is measured, by using multiple measurement data, which are obtained by multiple measurement operations, each representing a three-dimensional shape of a part of the measurement object.

Figure 2:
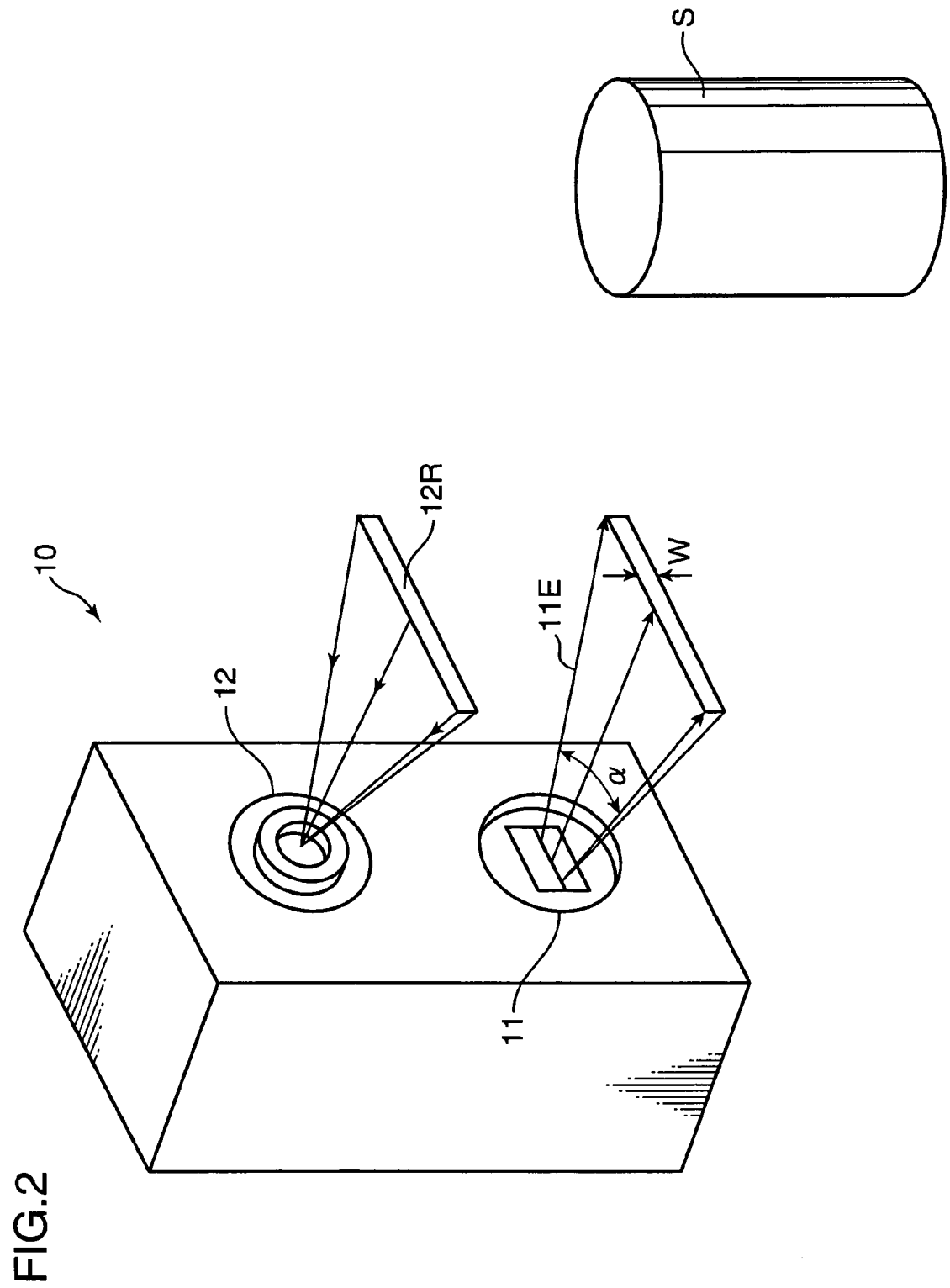
FIG. 2 is an explanatory diagram showing a light projecting/receiving operation to be executed by a three-dimensional digitizer.

FIG. 2 is an explanatory diagram showing a light projecting/receiving operation to be executed by the three-dimensional digitizer 10. The three-dimensional digitizer 10 is adapted to obtain three-dimensional data concerning the measurement object S, using a light section method. The three-dimensional digitizer 10 has a substantially rectangular parallelepiped housing with a built-in optical unit provided with a light emitter and a light receiver. A light projector 11 formed with a light projection window, and a light receiver 12 formed with a light receiving window are provided in the housing. The light projector 11 is provided below the light receiver 12 by a predetermined distance depending on a baseline length.

The light projector 11 emits slit light 11E, which is a laser beam flux irradiated in a horizontal direction. The slit light 11E is planar light which is irradiated with a radiation angle $\phi$ in the horizontal direction i.e. with a fan-like shape, and has a width W in a vertical direction. The slit light 11E is projected toward the measurement object S. In this embodiment, the width W of the slit light corresponds to the vertical size of five pixels of an image sensor 122 to be described later. When the projected slit light 11E is reflected on the surface of the measurement object S, a part of reflected light 12R is allowed to be incident onto the light receiver 12.

Figure 3:
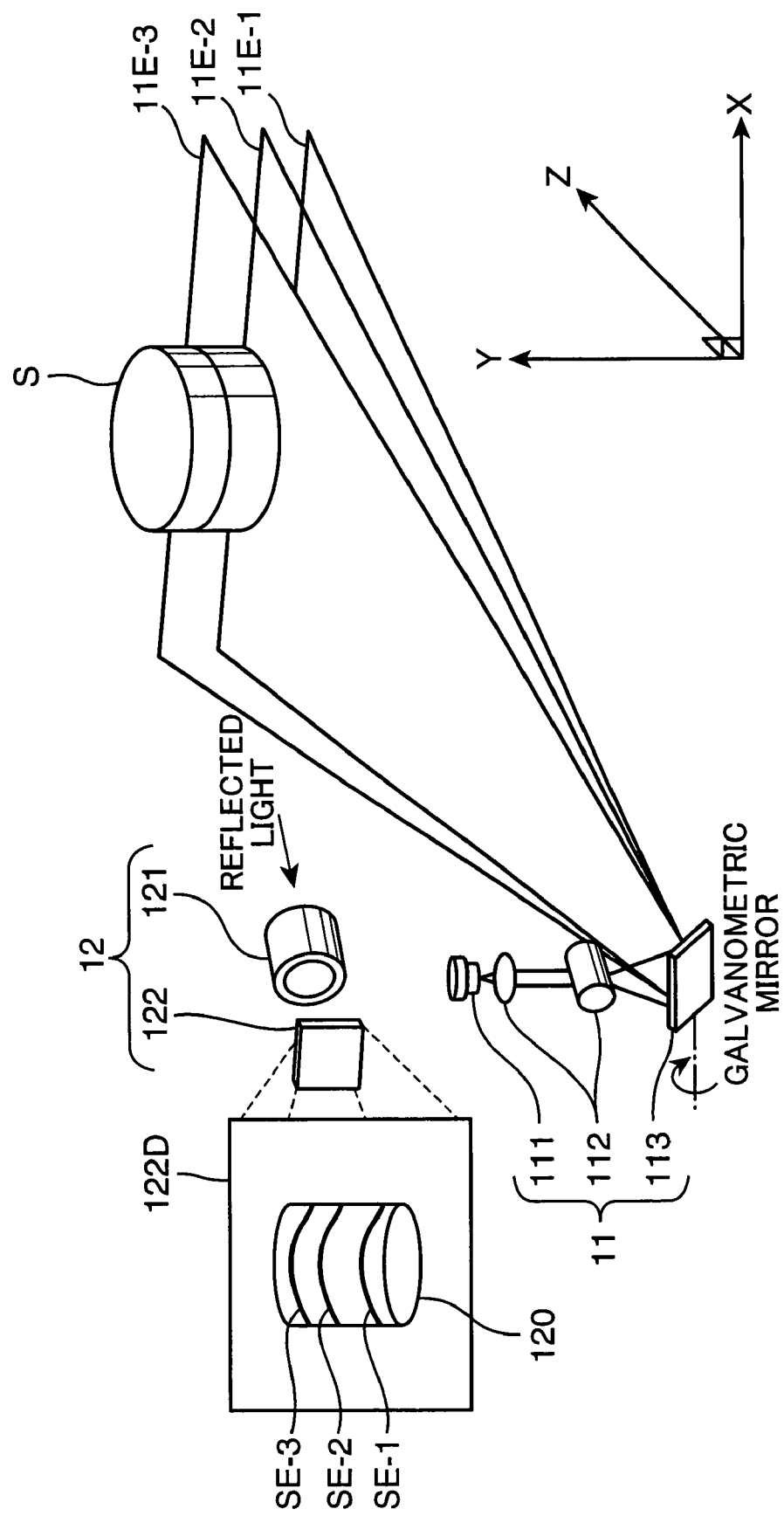
FIG. 3 is a diagram showing a basic internal arrangement of the three-dimensional digitizer.
Figure 4:
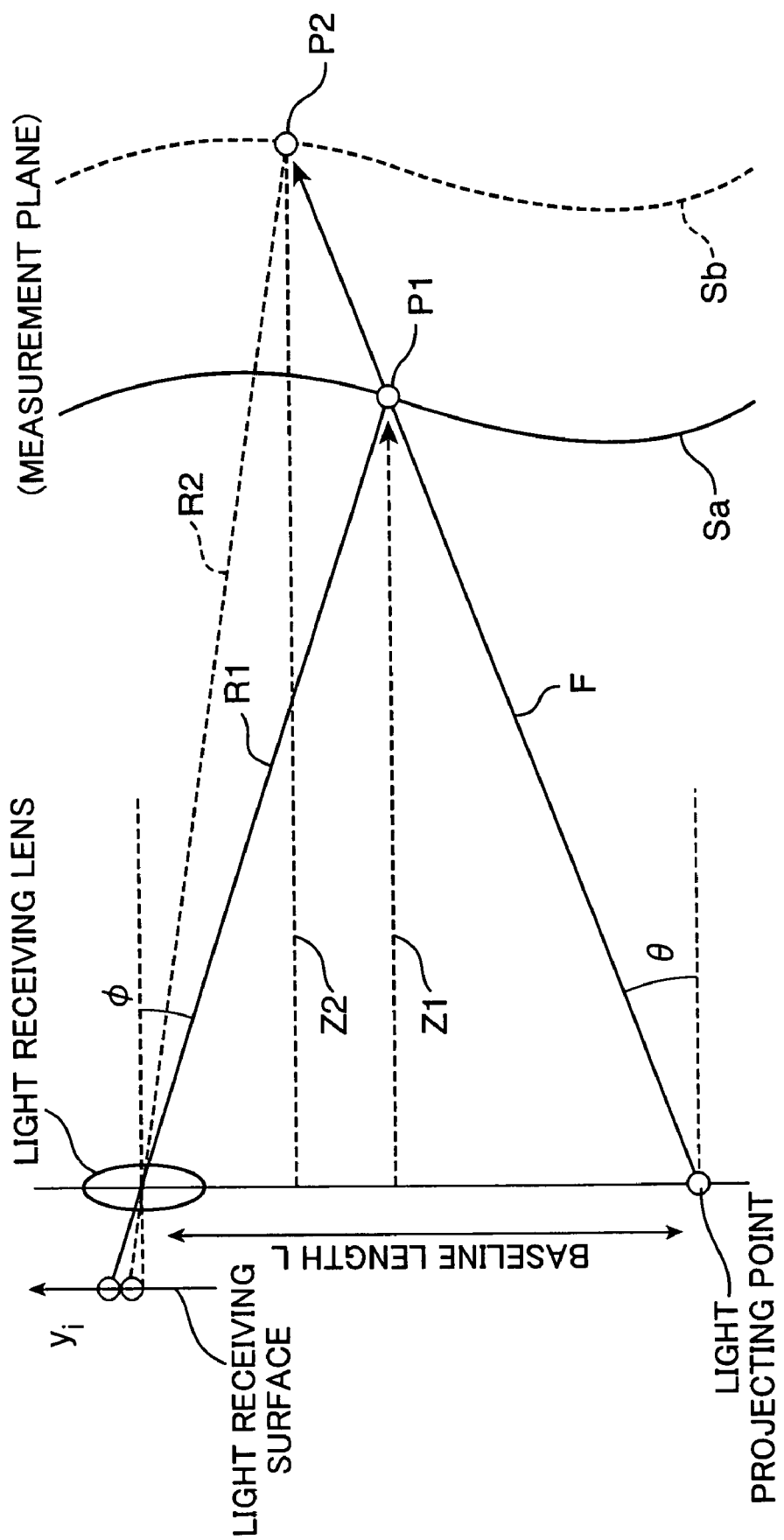
FIG. 4 is an explanatory diagram showing a principle of a three-dimensional shape measuring method to be performed by the three-dimensional digitizer.

FIG. 3 is a diagram showing a basic internal arrangement of the three-dimensional digitizer 10. FIG. 4 is an explanatory diagram showing a principle of a three-dimensional shape measuring method to be used by the three-dimensional digitizer 10.

As shown in FIG. 3, the light projector 11 includes a laser light source 111, as a light source, for generating laser light, a light projecting optical system 112 for guiding the laser light toward the light projection window, and a galvanometric mirror 113 which is rotated about a plane. The light receiver 12 includes a light receiving optical system 121 for receiving the reflected light 12R, and the image sensor 122 provided with a CCD (Charge Coupled Device) arranged on an optical path of the light receiving optical system 121.

The light projector 11 sequentially projects slit laser beams 11E-1, 11E-2, and 11E-3 onto the measurement object S by rotating the galvanometric mirror 113 with a predetermined rotation angle. The light projection is performed to scan the entire area on the surface of the measurement object S. The light reflected on the entire area of the measurement object S is received on the light receiving surface of the image sensor 122 via the light receiving optical system 121.

For instance, a light image 122D received by the image sensor 122 includes slit light images SE-1, SE-2, and SE-3 in accordance with the stereoscopic configuration of the measurement object S. Then, the distance from the three-dimensional digitizer 10 to the measurement object S is calculated by the triangulation principle by a measurement data deriving section 15 (see FIG. 5), based on the projection angles of the slit laser beams 11E-1, 11E-2, and 11E-3, and the positions of the slit light images SE-1, SE-2, and SE-3 on the light receiving area of the image sensor 122.

A measurement principle to be used in the embodiment is described based on FIG. 4. First, a light projection angle $\theta$ of a laser beam F emitted from a certain light projecting point is calculated based on a rotation angle of the galvanometric mirror 113. Assuming that the laser beam F is reflected on a point P1 on a measurement plane Sa, and reflected light R1 from the point P1 is incident onto the light receiver 12, then, a light receiving angle $\phi$ of the reflected light R1 is calculated based on an imaging position yi of the reflected light R1, which is detected on the light receiving surface of the image sensor 122. Then, a distance Z1 to the point P1 on the measurement plane Sa is calculated based on a baseline length L between the light projecting point and the light receiving point, the light projection angle $\theta$, and the light receiving angle $\phi$. The same measurement principle is applied to reflected light R2 reflected on a point P2 on another measurement plane Sb. In the latter case, a distance Z2 to the point P2 on the measurement plane Sb is calculated in a similar manner as mentioned above. Thus, the distance calculated with respect to each of the measurement points on the surface of the measurement object S is converted into a coordinate i.e. a position in a common three-dimensional coordinate system, and multiple measurement data representing the respective coordinates are generated based on the distance data.

Referring back to FIG. 1, the personal computer 20 is operative to receive the measurement data acquired by the three-dimensional digitizer 10, and execute various computations to obtain the three-dimensional shape of the measurement object S. The personal computer 20 also includes an input/operation section 27 such as a keyboard 27a and a mouse 27b for allowing a user to input an intended command, and a display section 28 for displaying a screen image depending on the inputted command.

Figure 5:
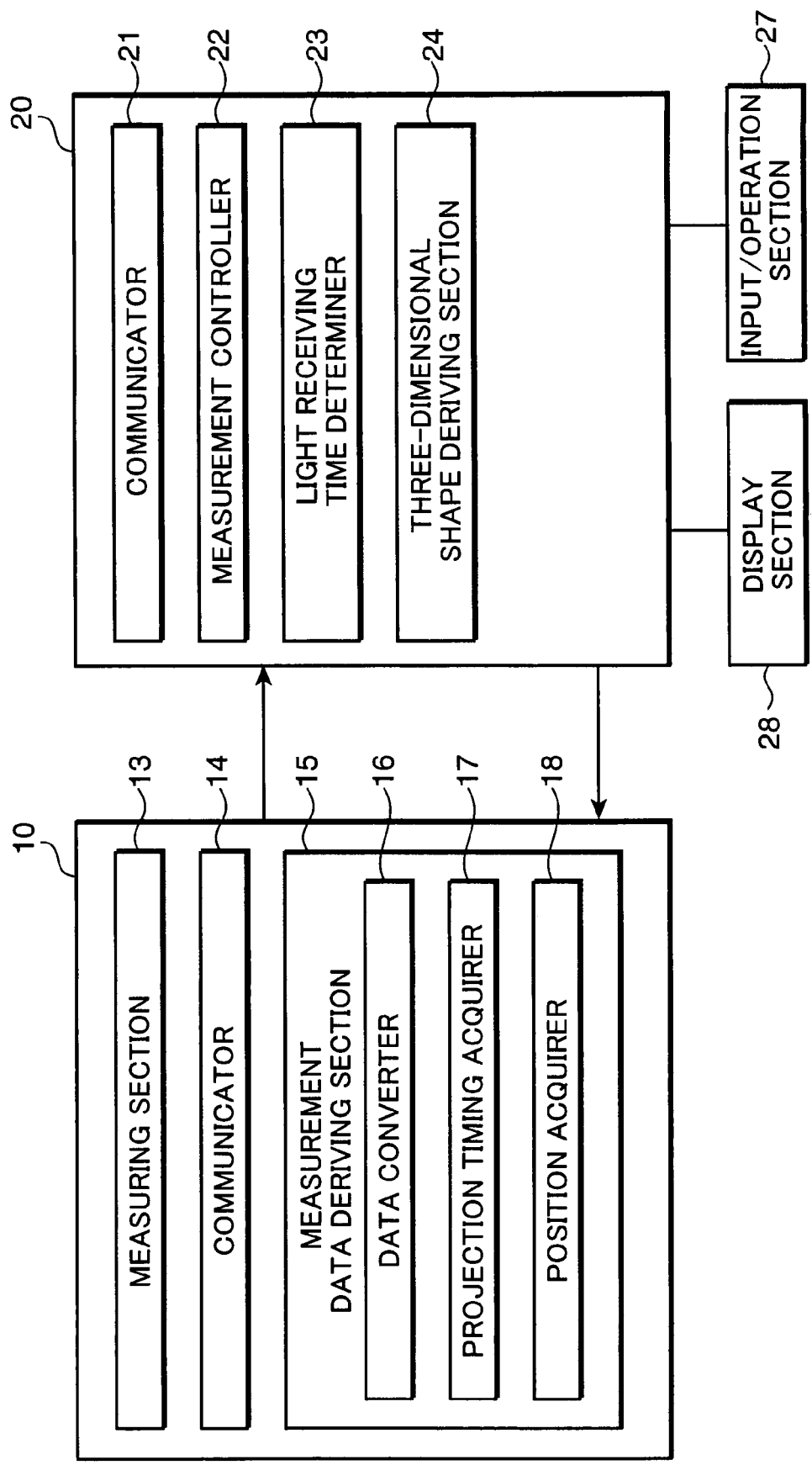
FIG. 5 is a block diagram showing an electric configuration of the three-dimensional shape measuring system.

FIG. 5 is a block diagram showing an arrangement of the three-dimensional shape measuring system 1. As shown in FIG. 5, the three-dimensional digitizer 10 includes a measuring section 13 provided with the light projector 11 and the light receiver 12, a communicator 14 for communicating various data with the personal computer 20, and the measurement data deriving section 15 for calculating a distance from the three-dimensional digitizer 10 to the measurement object S.

The communicator 14 communicates various data with the personal computer 20. Specifically, the communicator 14 sends, to the personal computer 20, measurement data obtained by performing a measurement operation at each of the measurement points by the three-dimensional digitizer 10, and receives data indicating a measurement start/end command or the like from the personal computer 20.

The measurement data deriving section 15 includes a data converter 16, a projection timing acquirer 17, and a position acquirer 18, which will be described later in detail.

The personal computer 20 functionally has a communicator 21 for communicating various data with the three-dimensional digitizer 10, a measurement controller 22, a light receiving time determiner 23, as a light receiving time setter, and a three-dimensional shape deriving section 24.

The measurement controller 22 causes the light projector 11 and the light receiver 12 of the three-dimensional digitizer 10 to perform a light projecting operation and a light receiving operation, respectively. The measurement controller 22 controls the three-dimensional digitizer 10 to scan the entire area on the surface of the measurement object S by causing the light receiver 12 to receive light reflected on the surface of the measurement object S onto the light receiving surface of the image sensor 122 at a predetermined cycle (hereinafter, called as "sampling cycle") while changing the projecting direction of the slit light 11E in such a manner that the projected position of the slit light 11E onto the measurement object S is shifted from e.g. a lower position to an upper position. In this embodiment, the projecting direction of the slit light 11E is intermittently changed in such a manner that the incident light position onto the light receiving surface of the image sensor 122 is sequentially shifted by the pitch corresponding to one pixel, and the light receiver 12 is allowed to receive the light each time the projecting direction of the slit light 11E is changed.

The three-dimensional shape measuring system 1 of the embodiment is operated at a prescan mode and a primary scan mode. The prescan mode is a mode in which a scanning operation with respect to the measurement object S is performed multiple times, with a light receiving time being changed in each of the scanning operations. The primary scan mode is a mode in which a light receiving time in each of sampling operations to be executed in the primary scan mode is determined, based on the light receiving data obtained in the prescan mode, and the scanning operations with respect to the measurement object S are performed based on the determined light receiving times.

The light receiving time determiner 23 determines a light receiving time in each of the sampling operations to be executed in the primary scan mode, based on the light receiving data obtained in the prescan mode. If the surface of the measurement object S has measurement points with different light reflectances, and the same light receiving time is set in projecting light onto a measurement point having a high light reflectance, and in projecting light onto a measurement point having a low light reflectance, a pixel that has received the light reflected on the measurement point having the high light reflectance may be saturated. If the three-dimensional shape of the measurement object S is attempted to be measured based on the output signal from the saturated pixel, a measurement error may be involved in the measured three-dimensional shape, because the output signal does not accurately represent the distance from the three-dimensional digitizer 10 to the measurement point having the high light reflectance.

In view of the above, the light receiving time determiner 23 determines an optimum light receiving time in each of the sampling operations to be executed in the primary scan mode, based on the multiple light receiving data obtained in the prescan mode. For instance, the light receiving time determiner 23 determines a light receiving time with respect to each of the pixels in the primary scan mode in accordance with the magnitude of the output signal obtained from each of the pixels by performing the scanning operations in the prescan mode. Specifically, if an output signal obtained in the prescan mode is small, the light receiving time in the primary scan mode is extended so that an output signal of a proper value is generated in the primary scan mode. On the other hand, if an output signal obtained in the prescan mode is large, the light receiving time in the primary scan mode is shortened so that an output signal of a proper value is generated in the primary scan mode. Preferably, the light receiving time in the prescan mode is set short to prevent a pixel from saturating in a light receiving operation in the prescan mode.

Figure 6:
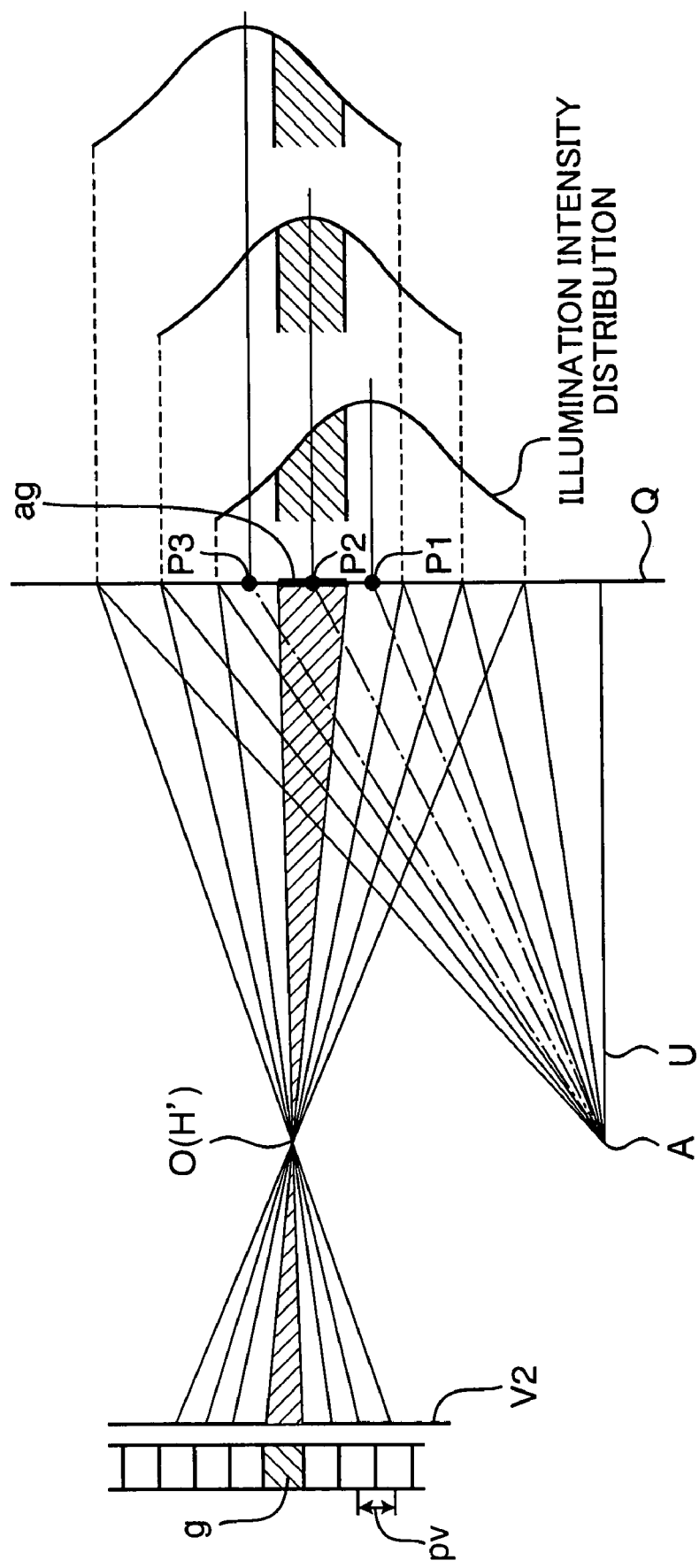
FIG. 6 is a diagram for describing an approach of calculating a position of a certain measurement point on a surface of a measurement object.

FIG. 6 is a diagram for describing an approach of calculating a position of a certain measurement point on the surface of the measurement object S. FIG. 6 shows a change in light incident position on a light receiving surface V2 where the slit light 11E reflected on the surface of the measurement object S is incident, in projecting the slit light 11E onto the surface of the measurement object S, while changing the light projecting direction from a light projecting point A. In the following, the functions of the data converter 16, the projection timing acquirer 17, and the position acquirer 18 in the measurement data deriving section 15 are described, referring to FIG. 6.

As shown in FIG. 6, by changing the optical axis U of the slit light 11E i.e. the projecting direction of the slit light 11E from a lower position to an upper position e.g. in such a manner that the optical axis U passes the point P1, the point P2, and then the point P3, the light incident position on the light receiving surface V2 where the slit light 11E reflected on the surface of the measurement object S is incident is shifted from an upper position to a lower position. On the other hand, an illumination intensity distribution of light projected onto the surface of the measurement object S has an inversed U-shaped waveform that the light amount is maximum at an intersection of the optical axis U of the slit light 11E with the surface of the measurement object S, and that the light amount is gradually decreased, as the measurement point is away from the intersection.

Figure 7A:
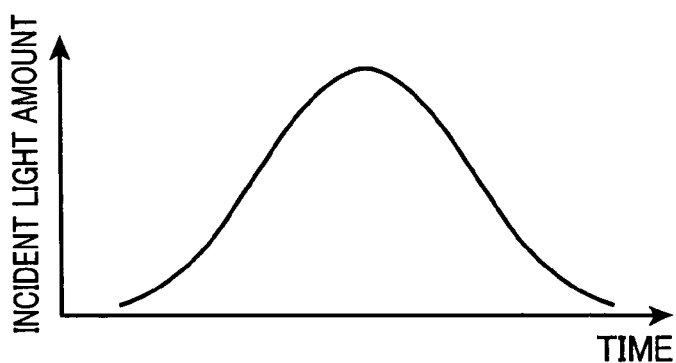
FIG. 7A is a graph showing a change in incident light amount onto a targeted pixel on a light receiving surface of an image sensor.

As the optical axis U of the slit light 11E is sequentially shifted from a lower position to an upper position, the measurement point on the surface of the measurement object S to be illuminated with the light having the aforementioned illumination intensity distribution is shifted from a lower area to an upper area. Under the condition, a change in the amount of light incident onto a targeted pixel "g" on the light receiving surface of the image sensor 122 is represented by an inverted U-shaped waveform, as shown in FIG. 7A.

In this embodiment, as mentioned above, the slit light 11E has the width W corresponding to the vertical size of five pixels of the image sensor 122. The projecting direction of the slit light 11E is sequentially changed in such a manner that the light incident position on the light receiving surface of the image sensor 122 is sequentially shifted by the pitch corresponding to one pixel. In this condition, the light receiver 12 receives the light each time the projecting direction of the slit light 11E is changed. Thus, five light receiving data are obtained from the targeted pixel "g" by performing a sampling operation five times.

Figure 7B:
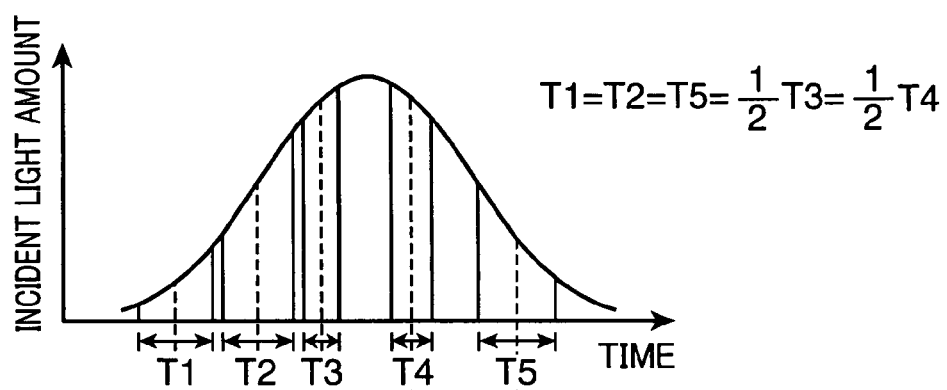
FIGS. 7B and 7C are diagrams for describing a process to be executed by primary elements of the embodiment.

The light receiving time in each of the sampling operations in the primary scan mode is determined by the light receiving time determiner 23, based on the light receiving data obtained in the prescan mode. For instance, FIG. 7B shows a case that a light receiving operation is performed five times with respect to the targeted pixel "g". Specifically, the pixel "g" receives the light for a light receiving time T1 in the first light receiving operation, for a light receiving time T2 in the second light receiving operation, for a light receiving time T3 in the third light receiving operation, for a light receiving time T4 in the fourth light receiving operation, and for a light receiving time T5 in the fifth light receiving operation. In this example, the light receiving times T1, T2, and T5 in the first, the second, and the fifth light receiving operations are identical to each other. The light receiving times T3 and T4 in the third and the fourth light receiving operations are each set to one-half of the light receiving time T1, T2, T5 in the first, the second, the fifth light receiving operation. In other words, the light receiving time $T3=T4=(\frac{1}{2}) \times T1$. In the above condition, the data converter 16, the projection timing acquirer 17, and the position acquirer 18 perform the following operations.

First, the data converter 16 converts the light receiving data obtained by the light receiving operation in each of the sampling operations into light receiving data which is normalized with respect to the light receiving time i.e. light receiving data with a standardized light receiving time. In the example shown in FIG. 7B, the light receiving time T3, T4 in the third, fourth light receiving operation is set to one-half of the light receiving time T1, T2, T5 in the first, the second, the fifth light receiving operation. In this case, the data converter 16 converts the light receiving data i.e. an output value D obtained in the third, the fourth light receiving operation into light receiving data i.e. an output value 2D, which is expected to be obtained if the targeted pixel "g" has received the light for a time equal to the light receiving time T1, T2, T5 in the first, the second, the fifth light receiving operation, as shown by the arrow A in FIG. 7C.

The projection timing acquirer 17 acquires center timings t1, t2, t3, t4, and t5 in light receiving periods corresponding to the light receiving times T1, T2, T3, T4, and T5 in the light receiving operations, and correlates the timings t1 through t5 with the light receiving data obtained by the data conversion by the data converter 16, respectively. Then, the projection timing acquirer 17 performs an operation of acquiring a characteristic curve (1) shown in FIG. 7C by a well-known interpolation computation.

Also, the projection timing acquirer 17 obtains a timing $T_{peak}$ corresponding to an apex T of the characteristic curve (1), and sets the timing $T_{peak}$ as a timing (hereinafter, called as "time centroid") at which the light receiving amount of the targeted pixel "g" is maximum. The time centroid $T_{peak}$ is a timing when the optical axis U of the slit light 11E passes a measurement point on the surface of the measurement object S from which the reflected light is incident onto the targeted pixel "g". In the example shown in FIG. 7C, the light receiving amount of the targeted pixel "g" is maximum at a timing between the timing t3 and the timing t4, where an apex $N_{peak}$ appears.

The position acquirer 18 calculates a distance from the three-dimensional digitizer 10 to the measurement point on the surface of the measurement object S from which the reflected light is incident onto the targeted pixel "g", by the triangulation principle, based on a relation between the projecting direction of the slit light 11E at the timing $T_{peak}$, which is acquired by the projection timing acquirer 17, and the incident direction of the slit light 11E onto the targeted pixel "g".

Then, the three-dimensional shape deriving section 24 acquires the three-dimensional shape of the entirety of the measurement object S, based on the measurement data representing the respective distances calculated by the position acquirer 18, after the three-dimensional shape of the measurement object S is measured by the three-dimensional digitizer 10, and the measurement data representing the distance from the three-dimensional digitizer 10 to each of the measurement points on the surface of the measurement object S is acquired by the position acquirer 18.

Figure 8:
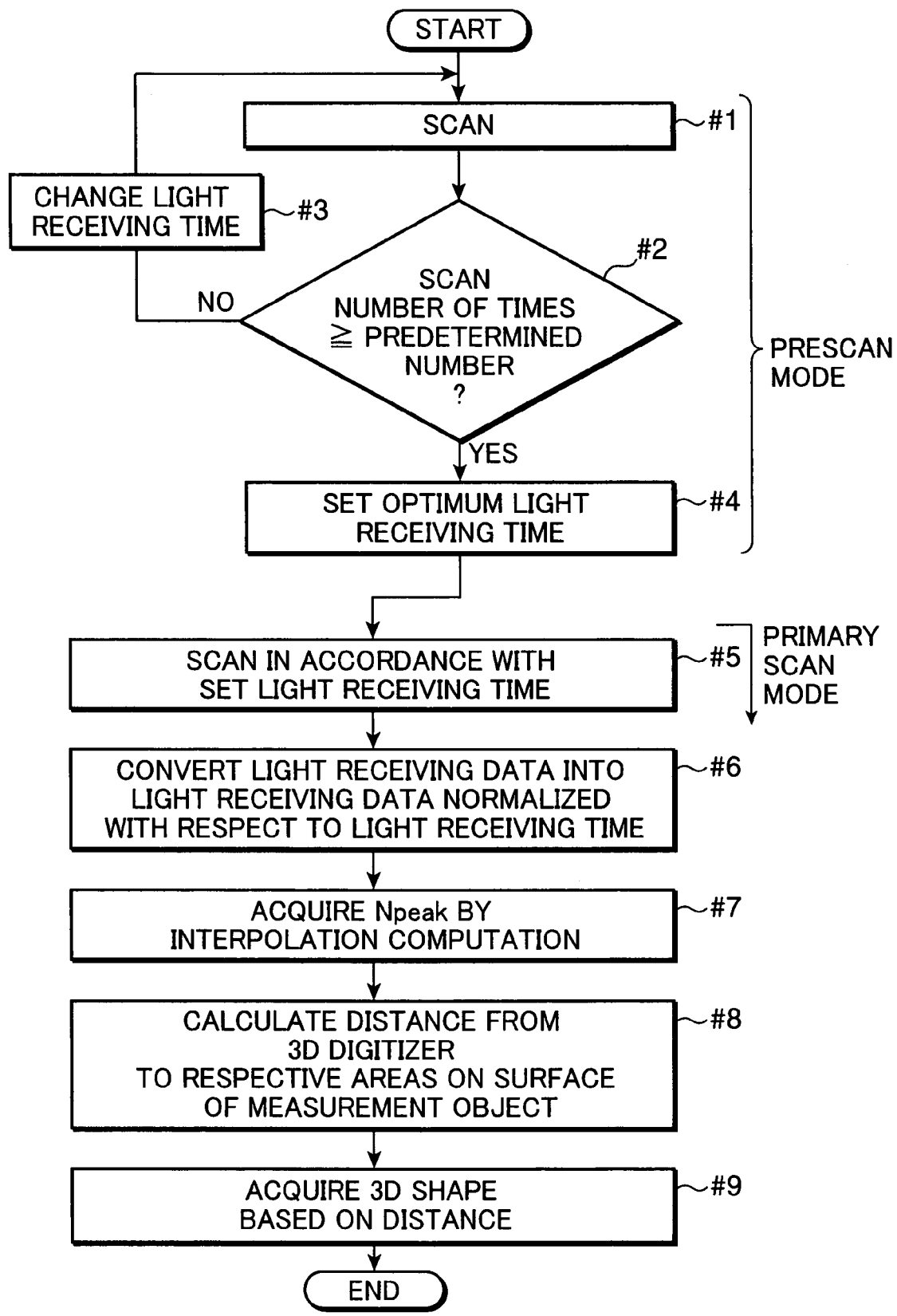
FIG. 8 is a flowchart showing a three-dimensional shape measuring process to be executed by the three-dimensional shape measuring system.

FIG. 8 is a flowchart showing a three-dimensional shape measuring process to be executed by the three-dimensional shape measuring system 1.

Referring to FIG. 8, the three-dimensional digitizer 10 performs a scanning operation with respect to the measurement object S (Step #1). If the number of times of the scanning operations has not reached a predetermined number (NO in Step #2), the three-dimensional digitizer 10 performs the scanning operation in Step #1 after the light receiving time is changed (Step #3). If the number of times of the scanning operations has reached the predetermined number (YES in Step #2), the personal computer 20 sets an optimal light receiving time in each of the sampling operations, based on the multiple light receiving data obtained by the scanning operations of the predetermined number of times (Step #4). Steps #1 through #4 are the processes to be executed in the prescan mode. In Step #5 and thereafter, the processes in the primary scan mode are executed.

Figure 7C:
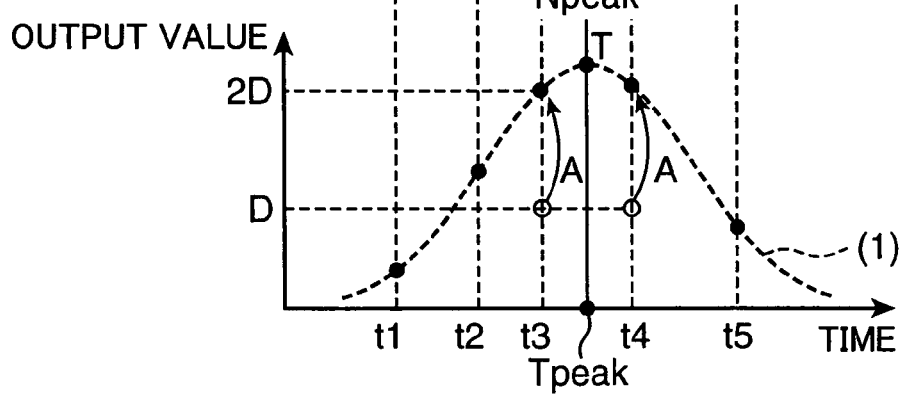

In the primary scan mode, the three-dimensional digitizer 10 performs a scanning operation with respect to the measurement object S with the light receiving time set by the personal computer 20 (Step #5). Then, the three-dimensional digitizer 10 controls the data converter 16 to convert the light receiving data obtained in the scanning operation in Step #5 into light receiving data which is normalized with respect to the light receiving time (Step #6). Then, the apex $N_{peak}$ as shown in e.g. FIG. 7C is acquired by the well-known interpolation computation, based on a correlation between the center timing in the light receiving period in each of the sampling operations executed in the scanning operation in Step #5, and the light receiving data acquired in Step #6 (Step #7).

Then, the three-dimensional digitizer 10 calculates a distance from the three-dimensional digitizer 10 to each of the measurement points on the surface of the measurement object S, by using the time centroid $T_{peak}$ corresponding to the apex $N_{peak}$ acquired in Step #7 (Step #8). Then, the personal computer 20 is operative to derive the three-dimensional shape of the measurement object S, based on the distance calculated in Step #8 (Step #9).

As mentioned above, the light receiving time in each of the sampling operations is changed in the primary scan mode. This enables to prevent or suppress likelihood that a pixel(s) of the image sensor 122 may be saturated resulting from a high light reflectance on the measurement point(s) on the surface of the measurement object S, thereby failing to acquire light receiving data accurately representing the positions of the respective measurement points on the surface of the measurement object S. Thus, the arrangement is advantageous in accurately measuring the three-dimensional shape of the measurement object S.

The embodiment is particularly advantageous in accurately acquiring the time centroid $T_{peak}$, because the time centroid $T_{peak}$ is acquired by correlating the light receiving data obtained by normalizing the multiple light receiving data obtained with the different light receiving times, to the center timing in the respective light receiving periods during which the light receiving data have been obtained.

Figure 7D:
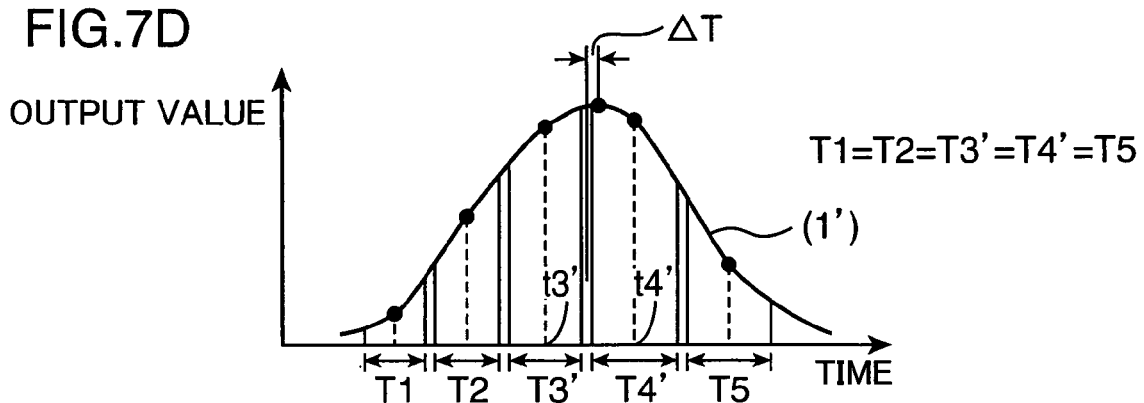
FIG. 7D is a diagram for describing a technique in contrast with the process to be executed by the primary elements of the embodiment.

Specifically, let it be assumed that each of the sampling operations with respect to a certain pixel is performed with the same light receiving time, and the time centroid is calculated by correlating the center timing in the light receiving period, to the light receiving data obtained in each of the sampling operations i.e. the light receiving data after the data conversion. In such a case, as shown in FIG. 7D, the timing corresponding to the light receiving data obtained by the third sampling operation and the fourth sampling operation is displaced from the center timing in the actual light receiving period in the third sampling operation and the fourth sampling operation. As a result, the calculated time centroid is displaced from the actual time centroid by a displacement amount ΔT. If such a displacement occurs, a measurement error may be involved in the distance from the three-dimensional digitizer 10 to the measurement point on the surface of the measurement object S, which is acquired by using the timing, and resultantly, a measurement error may be involved in the measured three-dimensional shape of the measurement object S.

On the other hand, in the embodiment, the light receiving data obtained in each of the sampling operations is correlated to the center timing in the light receiving period in each of the sampling operations. Accordingly, the time centroid $T_{peak}$ calculated by the interpolation computation is approximated to the actual time centroid. As a result, the timing at which the optical axis of the slit light 11E passes each of the measurement points on the surface of the measurement object S can be accurately obtained. This enables to accurately measure the three-dimensional position of each of the measurement points on the surface of the measurement object, with use of the timing, and accordingly, to accurately measure the three-dimensional shape of the measurement object.

The invention may include the following modifications in addition to or in place of the embodiment.

(1) In the embodiment, the light receiving time in each of the sampling operations in the primary scan mode is determined by using the light receiving data obtained in the prescan mode. Then, the sampling operations in the primary scan mode are executed with the respective determined light receiving times. Alternatively, an optimum light receiving time to be used in each of the sampling operations may be selected and determined from the light receiving data obtained by multiple scanning operations with different light receiving times. In the modification, it is possible to acquire a center timing in a light receiving period corresponding to the determined light receiving time, and to acquire the time centroid, based on the center timing, and light receiving data obtained in a light receiving time corresponding to the center timing.

Figure 9A:
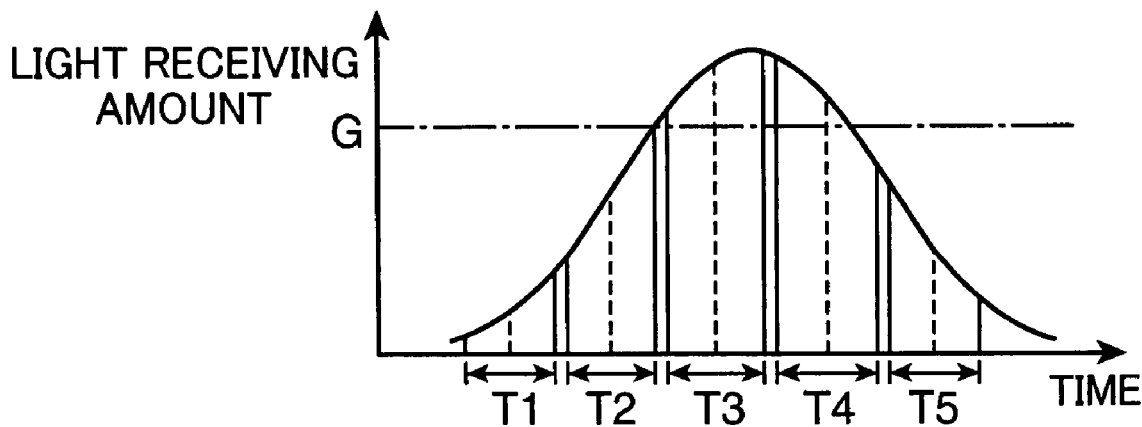
FIGS. 9A through 9C are diagrams for describing a first modification of the embodiment.

For instance, let it be assumed that a scanning operation with respect to the measurement object S is performed twice, and the light receiving time (hereinafter, called as the "first light receiving time") in one of the scanning operations has a duration twice as long as that of the light receiving time (hereinafter, called as the "second light receiving time") in the other one of the scanning operations. In this condition, as shown in FIG. 9A, in the case where the scanning operation is performed with the first light receiving time, light receiving data obtained by the third and the fourth sampling operations, which exceed a threshold value G among the light receiving data obtained by the respective sampling operations, are saturated light receiving data.

Figure 9B:
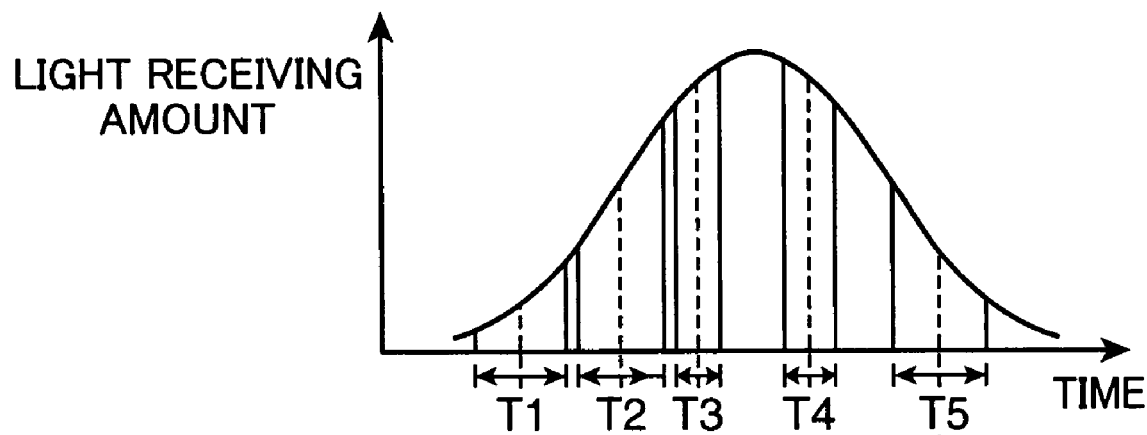
Figure 9C:
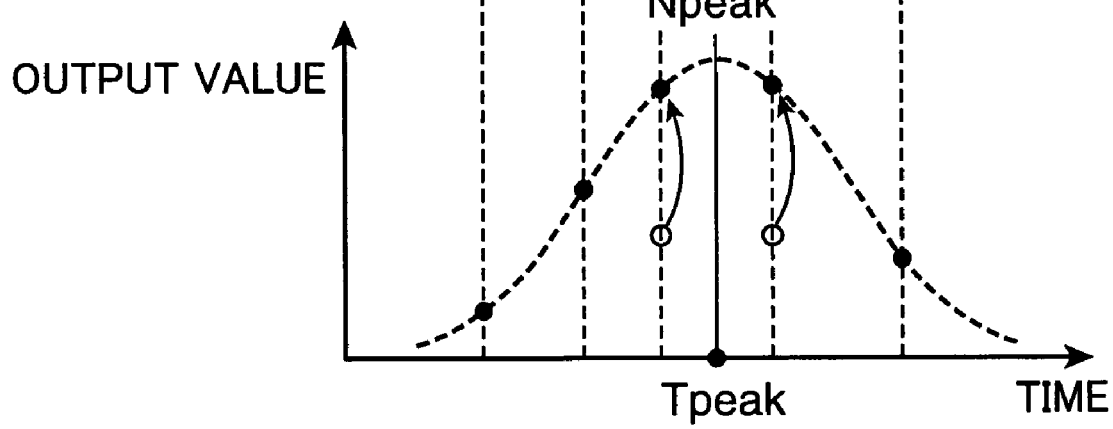

In the above condition, as shown in FIG. 9B, the saturated light receiving data is converted into light receiving data which is supposed to be obtained by performing the scanning operation with the second light receiving time. Then, the time centroid $T_{peak}$ is acquired in the similar manner as in the embodiment, as shown in FIG. 7C, by correlating the light receiving data after the data conversion, to the center timing in a light receiving period corresponding to the light receiving time after the data conversion i.e. the second light receiving time. With use of the approach, the three-dimensional shape of the measurement object S can be accurately measured in the similar manner as in the embodiment.

(2) In the embodiment and the first modification, the projecting direction of the slit light 11E is changed by rotating the galvanometric mirror 113 about a plane. The projecting direction of the slit light 11E may be changed by an arrangement other than the galvanometric mirror 113.

Further alternatively, in the case where the projecting direction of the slit light 11E is changed by rotating the galvanometric mirror 113 about a plane, the precision in measuring the three-dimensional shape of the measurement object can be improved by the following arrangement.

FIG. 10 is a diagram showing an example of a device arrangement of rotating the galvanometric mirror 113 about a plane in the second modification. As shown in FIG. 10, the device for rotating the galvanometric mirror 113 about a plane includes: a controller 40 for discretely outputting digital data representing a rotating direction and a rotating amount of the galvanometric mirror 113 along a time axis; an A/D converter 41 for converting the digital data outputted from the controller 40 into analog data; a drive circuit 42 for generating a drive signal based on analog data outputted from the D/A converter 41; and a galvanometric scanner 43 for rotating the galvanometric mirror 113 about a plane in response to the drive signal generated by the drive circuit 42.

Figure 11:
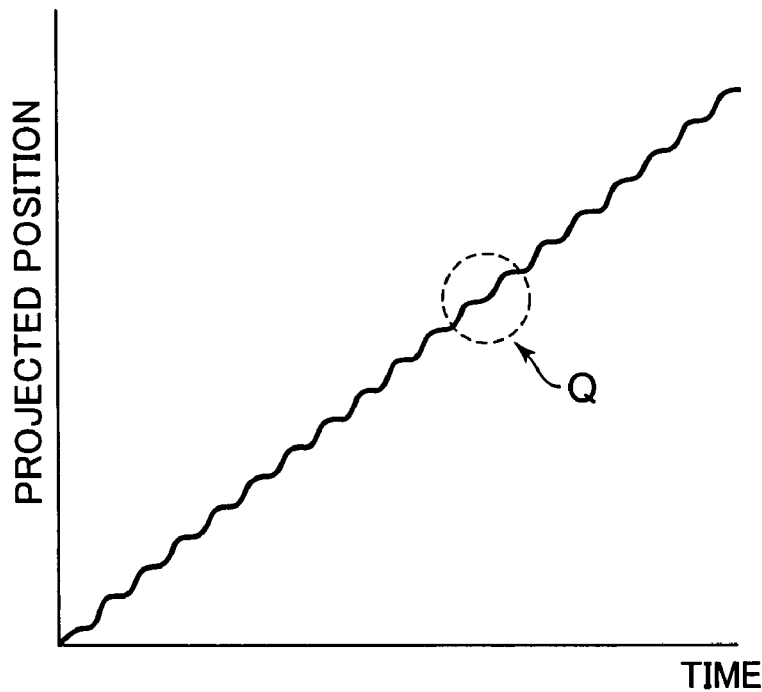
FIG. 11 is a diagram showing a change in projected position of slit light onto the surface of the measurement object, with time.

In the above arrangement, as shown in FIG. 11, the projected position of the slit light 11E onto the measurement object S is fluctuated at a predetermined cycle along a time axis, resulting from a response time characteristic of the galvanometric scanner 43.

Figure 13A:
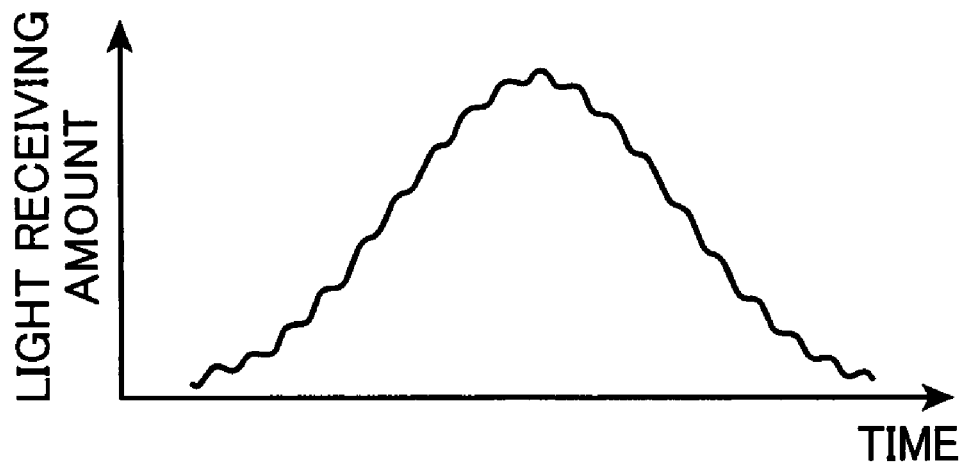
FIG. 13A is a graph showing a change in light receiving amount of a pixel with time.

In the embodiment and the first modification, the description is made on the premise that the light receiving amount of a targeted pixel is smoothly changed with time, as indicated by the inverted U-shaped waveform. However, observing a change in light receiving amount of a targeted pixel with time, based on a premise that the projected position of the slit light 11E is cyclically fluctuated, as shown in FIG. 11, the light receiving amount of the targeted pixel is changed in a fluctuating manner with respect to a time axis, as strictly shown in FIG. 13A.

Figure 13B:
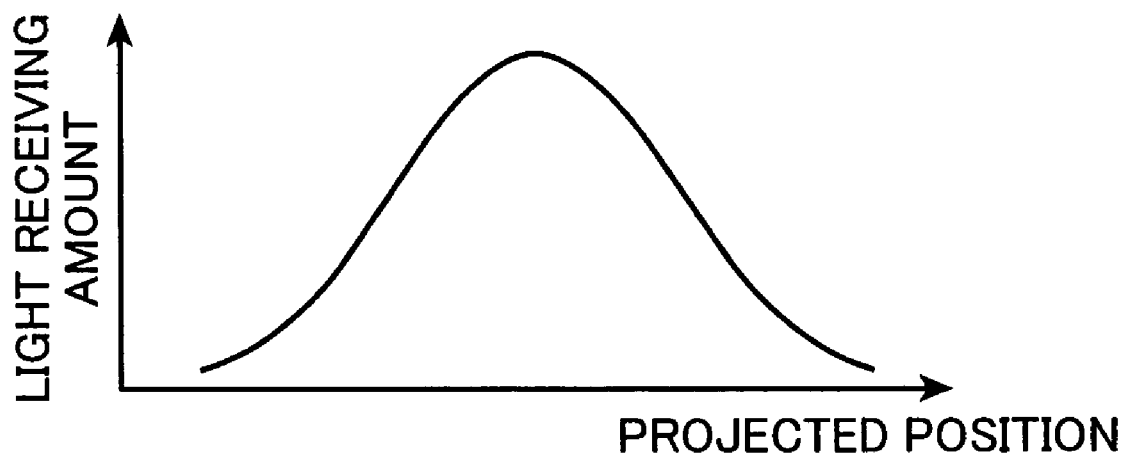
FIG. 13B is a graph showing a change in light receiving amount of a pixel with respect to a projected position of slit light.

However, if a change in light receiving amount of a targeted pixel with respect to the projected position of the slit light 11E is expressed in a graph, as shown in FIG. 13B, the graph shows an inverted U-shaped waveform representing a normal distribution.

In view of the above, in order to accurately measure the three-dimensional shape of the measurement object S in the arrangement of performing a scanning operation by rotating the galvanometric mirror 113 about a plane, it is desirable to acquire the projected position of the slit light 11E corresponding to a maximal output from each of the pixels, based on the change (see FIG. 13B) in light receiving amount of each of the pixels depending on the projected position of the slit light 11E, rather than acquiring the time centroid $T_{peak}$ based on the change in light receiving time of the targeted pixel with time (see FIG. 13A), as employed in the embodiment and the first modification. This is because the second modification is advantageous in reducing a measurement error involved in the measured three-dimensional shape of the measurement object in the aspect of utilizing the rectified waveform (see FIG. 13B).

Figure 12:
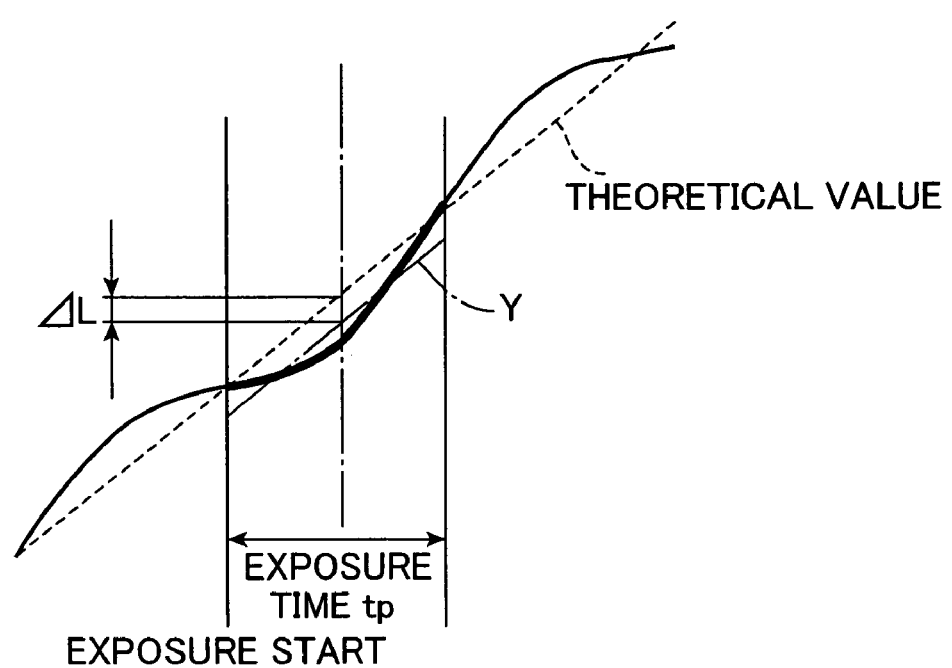
FIG. 12 is an enlarged view of a graph at a portion indicated by the arrow Q in FIG. 11, wherein a theoretical value concerning the projected position of slit light is indicated by the dotted line.

In view of the above, in the second modification, the projected position of the slit light 11E corresponding to a maximal output from each of the pixels is acquired, based on a change in light receiving amount of each of the pixels depending on the projected position of the slit light 11E. FIG. 12 is an enlarged view of a graph at a portion indicated by the arrow Q in FIG. 11, wherein a theoretical value concerning the projected position of the slit light 11E is indicated by the dotted line.

The light receiving start timing in each of the sampling operations is the same in all the light receiving times. In the characteristic shown in FIG. 12, changes in projected position of the slit light 11E in light receiving periods are averaged. Then, a relation between a duration of the light receiving time to be expected, and a change amount concerning the projected position of the slit light 11E in the expected light receiving time is stored in the form of a lookup table, based on the characteristic shown in FIG. 12. The line segment "Y" in FIG. 12 is a graphical expression obtained by averaging changes in projected position of slit light in a light receiving period corresponding to a specified light receiving time tp.

Figure 14A:
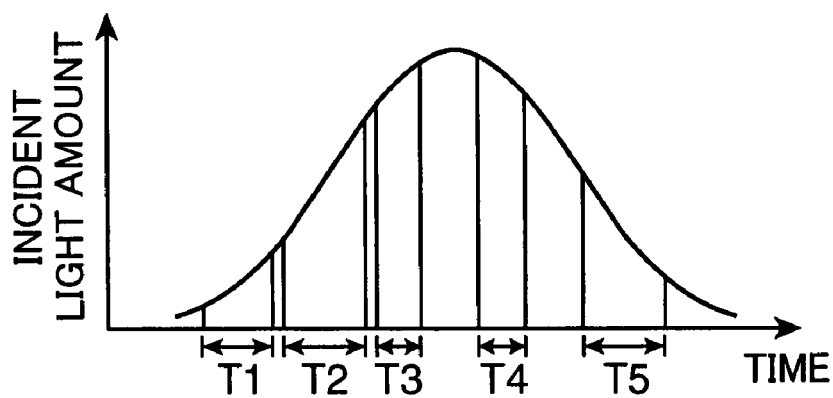
FIGS. 14A through 14C are diagrams for describing a process to be executed by the primary elements in the second modification.
Figure 14B:
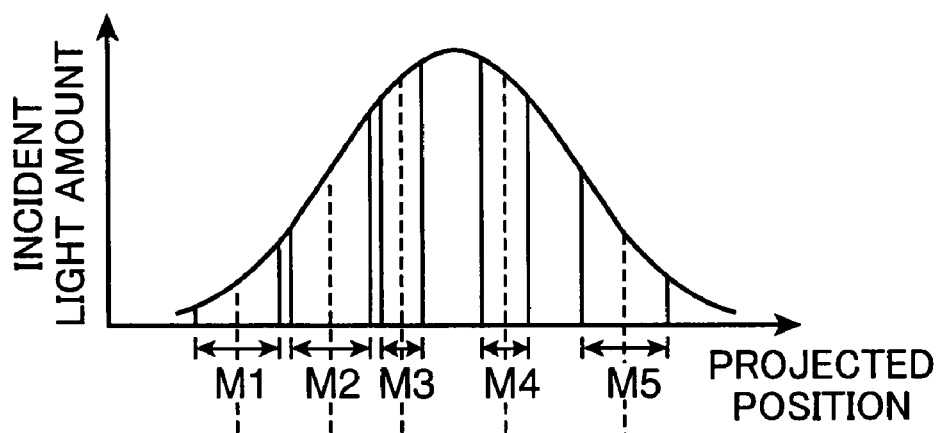

Now, let it be assumed that a scanning operation with respect to the measurement object S by the measuring section 13 is completed, and sampling operations are performed with respect to a certain targeted pixel "g" with the light receiving times T1 through T5, as shown in FIG. 14A. Then, the measurement data deriving section 15 is operative to acquire the point of time (initial position of slit light projection) at which the light receiver 12 starts to receive the slit light 11E in each of the light receiving times T1 through T5, and the point of time (end position of slit light projection) at which the light receiver 12 terminates each of the light receiving operations, with use of the lookup table, as shown in FIG. 14B. By performing the above operations, position change periods M1, M2, M3, M4, and M5 corresponding to the light receiving times T1, T2, T3, T4, and T5 during which the projected position of the slit light 11E is changed are specified.

Figure 14C:
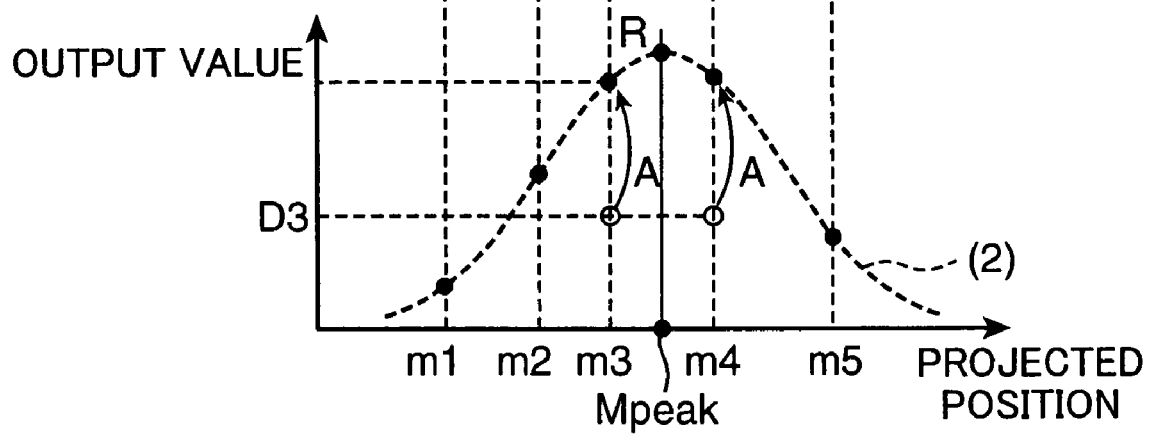

Then, the measurement data deriving section 15 is operative to convert the respective light receiving data obtained in the position change periods M1 through M5 into light receiving data which is normalized with respect to the light receiving time in the similar manner as in the embodiment. Then, the light receiving data after the data conversion are correlated to middle projected positions (middle positions between the initial positions and the end positions) m1, m2, m3, m4, and m5, corresponding to the center timings t1, t2, t3, t4, and t5 (see FIG. 7C) in the light receiving periods of the sampling operations. Then, a characteristic curve (2) as shown in FIG. 14C is derived by performing a predetermined interpolation computation, based on the correlation.

Also, the measurement data deriving section 15 obtains a projected position $M_{peak}$ i.e. a centroid position, corresponding to the apex R of the characteristic curve (2), and sets the centroid position $M_{peak}$, as a projected position where the optical axis of the slit light 11E passes a measurement point on the surface of the measurement object S, from which the reflected light of the slit light 11E is incident onto the targeted pixel "g".

Then, as mentioned above, the measurement data deriving section 15 calculates a distance from the three-dimensional digitizer 10 to the measurement point on the surface of the measurement object S from which the reflected light of the slit light 11E is incident onto the targeted pixel "g", i.e., a three-dimensional position of each of the measurement points on the surface of the measurement object S, by the triangulation principle, based on a relation between the projecting direction of the slit light 11E corresponding to the projected position, and the incident direction of the slit light 11E onto the targeted pixel "g".

As mentioned above, in the case where the three-dimensional digitizer 10 has the arrangement of performing a scanning operation by rotating the galvanometric mirror 113 about a plane, further precision in measuring the three-dimensional shape of the measurement object S can be obtained by performing the above operations.

The foregoing embodiment and/or modifications primarily include the inventions having the following arrangements.

A three-dimensional shape measuring system according to an aspect of the invention includes: a light projecting/receiving apparatus having: a light projector for projecting light toward a measurement object; and a light receiver having a light receiving surface, the light projecting/receiving apparatus causing the light receiver to receive the light reflected on a surface of the measurement object onto the light receiving surface thereof at a predetermined cycle multiple times, while causing the light projector to change a projecting direction of the light; and a measuring apparatus for acquiring a position, in a predetermined three-dimensional coordinate system, of each of measurement points on the surface of the measurement object by utilizing light receiving data representing a light receiving amount of the light receiver to be outputted from the light projecting/receiving apparatus to measure a three-dimensional shape of the measurement object based on the acquired positions in the three-dimensional coordinate system. The measuring apparatus includes: a light receiving time setter for setting a light receiving time in each of the cycles with respect to each of a plurality of light receiving areas constituting the light receiving surface; a data converter for converting an output value representing the light receiving data obtained in the each of the cycles into an output value which is standardized with respect to the light receiving time in the each of the cycles, if the light receiving times set by the light receiving time setter are different in the cycles in performing the light receiving operation by the each of the light receiving areas; a projection timing acquirer for acquiring a projection timing at which the light receiving amount of the each of the light receiving areas is maximum, by using a center timing in a light receiving period in the each of the cycles, and light receiving data to be obtained after the conversion by the data converter; and a position acquirer for acquiring a position of the measurement point on the surface of the measurement object corresponding to the each of the light receiving areas, based on a relation between the projecting direction of the light at each of the projection timings acquired by the projection timing acquirer, and an incident direction of the light which is reflected on the surface of the measurement object and is incident onto the each of the light receiving areas.

A three-dimensional shape measuring method according to another aspect of the invention includes: preparing a light projector for projecting light toward a measurement object, and a light receiver having a light receiving surface; setting, in performing a light projecting/receiving operation of receiving the light reflected on a surface of the measurement object onto the light receiving surface at a predetermined cycle multiple times, while changing a projecting direction of the light, a light receiving time in each of the cycles with respect to each of a plurality of light receiving areas constituting the light receiving surface; acquiring light receiving data in the each of the cycles by performing the light projecting/receiving operations; converting an output value representing the light receiving data obtained in the each of the cycles into an output value which is standardized with respect to the light receiving time in the each of the cycles, if the light receiving times set in the light receiving time setting operation are different in the cycles; acquiring a projection timing at which a light receiving amount of each of the light receiving areas is maximum, by using a center timing in a light receiving period in the each of the cycles, and light receiving data to be obtained after the conversion operation; acquiring a position, in a predetermined three-dimensional coordinate system, of each of measurement points on the surface of the measurement object, based on a relation between the projecting direction of the light at each of the projection timings acquired in the projection timing acquisition operation, and an incident direction of the light which is reflected on the surface of the measurement object and is incident onto the each of the light receiving areas; and deriving a three-dimensional shape of the measurement object based on the acquired positions in the three-dimensional coordinate system.

In the aforementioned system or method, the output value representing the light receiving data obtained in each of the cycles is converted into the output value which is standardized with respect to the light receiving time in each of the cycles in performing the light receiving operation on each of the light receiving areas. Then, the projection timing at which the light receiving amount of each of the light receiving areas is maximum is acquired, by using the center timing in the light receiving period in each of the cycles, and the light receiving data to be obtained after the conversion. With this arrangement, the projection timing at which the light receiving amount with respect to each of the light receiving areas is maximum can be accurately acquired. This enables to measure the three-dimensional shape of the measurement object with high precision.

Preferably, in the above arrangement, the light receiving time setter sets the light receiving time in the each of the cycles depending on a light reflectance at the measurement point on the surface of the measurement object corresponding to the each of the light receiving areas.

The above arrangement enables to prevent or suppress likelihood that the targeted light receiving area may be saturated resulting from a high light reflectance at the measurement point on the surface of the measurement object, thereby failing to acquire light receiving data accurately representing the position of the measurement point on the surface of the measurement object.

Preferably, the three-dimensional shape measuring method further includes: executing a prescan operation of scanning the light with respect to the measurement object multiple times, while changing the light receiving time in each of the scanning operations; and setting the light receiving time based on light receiving data obtained in the prescan operation.

A three-dimensional shape measuring system according to yet another aspect of the invention includes: a light projecting/receiving apparatus having: a light projector for projecting light toward a measurement object; and a light receiver having a light receiving surface, the light projecting/receiving apparatus causing the light receiver to receive the light reflected on a surface of the measurement object onto the light receiving surface thereof at a predetermined cycle multiple times, while causing the light projector to change a projecting direction of the light; and a measuring apparatus for acquiring a position, in a predetermined three-dimensional coordinate system, of each of measurement points on the surface of the measurement object by utilizing light receiving data representing a light receiving amount of the light receiver to be outputted from the light projecting/receiving apparatus to measure a three-dimensional shape of the measurement object based on the acquired positions in the three-dimensional coordinate system. The measuring apparatus includes: a first projected position acquirer for acquiring a light projected position on the surface of the measurement object corresponding to a light receiving start point of time, and a light projected position on the surface of the measurement object corresponding to a light receiving end point of time, in each of the cycles, with respect to each of a plurality of light receiving areas constituting the light receiving surface; a second projected position acquirer for acquiring a light projected position on the surface of the measurement object where the light receiving amount of each of the light receiving areas is maximum, by using a middle position between the light projected position corresponding to the light receiving start point of time and the light projected position corresponding to the light receiving end point of time, and the light receiving data; and a position acquirer for acquiring a position of the measurement point on the surface of the measurement object corresponding to the each of the light receiving areas, based on a relation between the projecting direction of the light corresponding to the light projected position acquired by the second projected position acquirer, and an incident direction of the light which is reflected on the surface of the measurement object and is incident onto the each of the light receiving areas.

A three-dimensional shape measuring method according to still another aspect of the invention includes: preparing a light projector for projecting light toward a measurement object, and a light receiver having a light receiving surface; performing a light projecting/receiving operation of receiving the light reflected on a surface of the measurement object onto the light receiving surface at a predetermined cycle multiple times, while changing a projecting direction of the light to acquire light receiving data in each of the cycles; acquiring a first light projected position on the surface of the measurement object corresponding to a light receiving start point of time, and a second light projected position on the surface of the measurement object corresponding to a light receiving end point of time, in the each of the cycles, with respect to each of a plurality of light receiving areas constituting the light receiving surface; acquiring a third light projected position on the surface of the measurement object where a light receiving amount of the each of the light receiving areas is maximum, by using a middle position between the first light projected position and the second light projected position, and the light receiving data; acquiring a position, in a predetermined three-dimensional coordinate system, of a measurement point on the surface of the measurement object corresponding to the each of the light receiving areas, based on a relation between the projecting direction of the light corresponding to each of the acquired third light projected positions, and an incident direction of the light which is reflected on the surface of the measurement object and is incident onto the each of the light receiving areas; and deriving a three-dimensional shape of the measurement object based on the acquired positions in the three-dimensional coordinate system.

In the aforementioned system or method, even if the change in light projected position is not constant, the light projected position on the surface of the measurement object where the light receiving amount of each of the light receiving areas is maximum can be accurately derived. This enables to measure the three-dimensional shape of the measurement object with high precision.

Preferably, the aforementioned three-dimensional shape measuring system further includes: a light receiving time setter for setting a light receiving time in the each of the cycles with respect to the each of the light receiving areas; and a data converter for converting an output value representing the light receiving data obtained in the each of the cycles into an output value which is standardized with respect to the light receiving time in the each of the cycles, if the light receiving times set by the light receiving time setter are different in the cycles in performing the light receiving operation on the each of the light receiving areas, wherein the first projected position acquirer acquires the light projected position corresponding to the light receiving start point of time and the light projected position corresponding to the light receiving end point of time so that the light receiving time is determined by the light receiving time setter, and the second projected position acquirer acquires the light projected position where the light receiving amount of the each of the light receiving areas is maximum, by using the middle position between the light projected position corresponding to the light receiving start point of time and the light projected position corresponding to the light receiving end point of time, and light receiving data to be obtained after the conversion by the data converter.

In the above arrangement, even if the light receiving times in the cycles are different from each other, the light projected position on the surface of the measurement object where the light receiving amount of each of the light receiving areas is maximum can be accurately derived.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A three-dimensional shape measuring method, comprising:
preparing a light projector for projecting light toward a measurement object, and a light receiver having a light receiving surface;
in conjunction with performing a light projecting/receiving operation of receiving the light projected on a surface of the measurement object and reflected onto the light receiving surface for a predetermined number of cycles and while changing a projecting direction of the light, setting a light receiving time in each of the cycles with respect to each of a plurality of light receiving areas constituting the light receiving surface;
acquiring light receiving data in the each of the cycles by performing the light projecting/receiving operations utilizing the light receiving time set for each of the cycles;
converting the light receiving data obtained in the each of the cycles into an output value, said output value being standardized with respect to the light receiving time in the each of the cycles if the light receiving times set in the light receiving time setting operation are different in the cycles;
acquiring a projection timing at which a light receiving amount of each of the light receiving areas is maximum by using a center timing in a light receiving period in the each of the cycles and the output value for each of the cycles;
acquiring a position, in a predetermined three-dimensional coordinate system, of each measurement point on the surface of the measurement object, based on a relation between the projecting direction of the light at each of the projection timings acquired in the projection timing acquisition operation and an incident direction of the light reflected onto the light receiving surface; and
deriving a three-dimensional shape of the measurement object based on the acquired positions in the three-dimensional coordinate system.

2. The three-dimensional shape measuring method according to claim 1, further comprising:
executing a prescan operation of scanning the light with respect to the measurement object multiple times, while changing the light receiving time in each of the scanning operations; and
setting the light receiving time based on light receiving data obtained in the prescan operation.

3. A three-dimensional shape measuring method, comprising:
preparing a light projector for projecting light toward a measurement object, and a light receiver having a light receiving surface;
performing a light projecting/receiving operation of receiving the light reflected on a surface of the measurement object onto the light receiving surface at a predetermined cycle multiple times, while changing a projecting direction of the light to acquire light receiving data in each of the cycles;
acquiring a first light projected position on the surface of the measurement object corresponding to a light receiving start point of time, and a second light projected position on the surface of the measurement object corresponding to a light receiving end point of time, in each of the cycles, with respect to each of a plurality of light receiving areas constituting the light receiving surface;
acquiring a third light projected position on the surface of the measurement object where a light receiving amount of the each of the light receiving areas is maximum, by using a middle position between the first light projected position and the second light projected position, and the light receiving data;
acquiring a position, in a predetermined three-dimensional coordinate system, of a measurement point on the surface of the measurement object corresponding to the each of the light receiving areas, based on a relation between the projecting direction of the light corresponding to each of the acquired third light projected positions and an incident direction of the light reflected onto the light receiving surface; and
deriving a three-dimensional shape of the measurement object based on the acquired positions in the three-dimensional coordinate system.

4. A three-dimensional shape measuring method, comprising:
preparing a light projector for projecting light toward a measurement object and a light receiver for receiving the projected light onto a light receiving surface;
performing a prescan operation of scanning the light with respect to the measurement object multiple times with the light projector and light receiver, while changing a light receiving time for at least a portion of the scanning operations;
determining an optimized light receiving time for each area of the measurement object based on light receiving data obtained in the prescan operation,
performing a light projecting/receiving operation by projecting light on a surface of the measurement object with the light projector and receiving light reflected onto the light receiving surface for a predetermined number of cycles while changing a projecting direction of the light, wherein the light receiving time in each of the cycles is set to the corresponding optimized light receiving time for that area of the measurement object;
acquiring light receiving data in the each of the cycles by performing the light projecting/receiving operations;
converting the light receiving data obtained in the each of the cycles into an output value;
using a center timing in a light receiving period and the output value of each of the cycles to acquire a projection timing at which a light receiving amount of each of the light receiving areas is maximum;
acquiring a position of each measurement point on the surface of the measurement object in a predetermined three-dimensional coordinate system utilizing a relation between the projecting direction of the light at each of the projection timings acquired in the projection timing acquisition operation, and an incident direction of the light on the light receiving surface; and
deriving a three-dimensional shape of the measurement object based on the acquired positions in the three-dimensional coordinate system.

* * * * *